(12) United States Patent
Juillard

(10) Patent No.: US 8,140,647 B1
(45) Date of Patent: Mar. 20, 2012

(54) SYSTEM AND METHOD FOR ACCELERATED DATA UPLOADING

(75) Inventor: Loic Juillard, Escondido, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 175 days.

(21) Appl. No.: 12/619,882

(22) Filed: Nov. 17, 2009

(51) Int. Cl.
*G06F 15/16* (2006.01)

(52) U.S. Cl. ......... 709/219; 709/203; 709/216; 709/223

(58) Field of Classification Search .......... 709/203, 709/16, 219, 223, 216–217
See application file for complete search history.

(56) References Cited

U.S. PATENT DOCUMENTS

| | | | |
|---|---|---|---|
| 7,792,845 B1 * | 9/2010 | Binns | 707/754 |
| 2004/0044740 A1 * | 3/2004 | Cudd et al. | 709/217 |
| 2007/0266062 A1 * | 11/2007 | Young | 707/204 |
| 2009/0164790 A1 * | 6/2009 | Pogodin | 713/176 |
| 2010/0043034 A1 * | 2/2010 | Li et al. | 725/87 |
| 2010/0077057 A1 * | 3/2010 | Godin et al. | 709/218 |
| 2010/0153556 A1 * | 6/2010 | Bellovin | 709/226 |
| 2010/0180082 A1 * | 7/2010 | Sebastian et al. | 711/126 |

FOREIGN PATENT DOCUMENTS

CN 101340399 A * 1/2009

* cited by examiner

*Primary Examiner* — Oanh Duong

(74) *Attorney, Agent, or Firm* — Law Office of Gerald Maliszewski; Gerald Maliszewski

(57) ABSTRACT

A method and system are provided for accelerated data uploading to a remote service device destination. An on-line (third party) storage device receives an upload request message from a network-connected client device. A unique first descriptor in a descriptor field of the upload request message is accessed and compared to a list of descriptors maintained by the on-line storage device. If the accessed first descriptor is on the list, a first file is read that is stored in the on-line storage device and associated with the accessed first descriptor. The first file is then sent to a network-connected remote service device.

9 Claims, 6 Drawing Sheets

SYSTEM AND METHOD FOR ACCELERATED DATA UPLOADING

BACKGROUND OF THE INVENTION

1. Field of the Invention

This invention generally relates to digital information communication and storage, and more particularly to a system and method for accelerating the uploading of data from a client to a network-connected remote service provider.

2. Description of the Related Art

As noted in Wikipedia, a proxy server is a server (a computer system executing an application program) that acts as an intermediary for requests from clients seeking resources from other servers. A client connects to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy server may optionally alter the client's request or the server's response, and sometimes it may serve the request without contacting the specified server. In this case, it 'caches' responses from the remote server, and returns subsequent requests for the same content directly.

A proxy server may be used to speed up access to resources through caching. For example, web proxies are commonly used to cache web pages from a web server. A proxy server can be placed in the user's local computer or at various points between the user and the destination servers on the Internet. A caching proxy server accelerates service requests by retrieving content saved from a previous request made by the same client or even other clients. Caching proxies keep local copies of frequently requested resources, allowing large organizations to significantly reduce their upstream bandwidth usage and cost, while significantly increasing performance. Most ISPs and large businesses have a caching proxy.

A proxy that focuses on World Wide Web traffic is called a "web proxy". The most common use of a web proxy is to serve as a web cache. Most proxy programs provide a means to deny access to URLs specified in a blacklist, thus providing content filtering. This is often used in a corporate, educational or library environment, and anywhere else where content filtering is desired. Some web proxies reformat web pages for a specific purpose or audience, such as for cell phones and PDAs. While a web proxy is useful in speeding inbound web content, it does not address the sending of outbound traffic from a client to a server. The lack of an outbound web proxy is compounded by the fact that most cable providers configure their inbound bandwidth (to the client) to be significantly broader than the outbound bandwidth from the client. This fact is evident to any residential client that has attempted to upload large amounts of data (e.g., a photo album) to a service provider.

If security was not an issue, then an intercepting proxy could perform some of the functions of an outbound web proxy. An intercepting proxy combines a proxy server with a gateway or router. Connections made by client browsers through the gateway are diverted to the proxy without client-side configuration (or often knowledge). Connections may also be diverted from a SOCKS server or other circuit-level proxies.

Intercepting proxies are also commonly referred to as "transparent" proxies, or "forced" proxies, presumably because the existence of the proxy is transparent to the user, or the user is forced to use the proxy regardless of local settings. Intercepting proxies are commonly used in businesses to prevent avoidance of acceptable use policy, and to ease administrative burden, since no client browser configuration is required. This second reason however is mitigated by features such as Active Directory group policy, or DHCP and automatic proxy detection. Intercepting proxies are also commonly used by ISPs in some countries to save upstream bandwidth and improve customer response times by caching.

The diversion/interception of a TCP connection creates several issues. First, the original destination IP and port must somehow be communicated to the proxy. This is not always possible (e.g., where the gateway and proxy reside on different hosts). There is a class of cross site attacks which depend on certain behavior of intercepting proxies that do not check or have access to information about the original (intercepted) destination. This problem can be resolved by using an integrated packet-level and application level appliance or software which is then able to communicate this information between the packet handler and the proxy.

Intercepting also creates problems for HTTP authentication, especially connection-oriented authentication such as NTLM, since the client browser believes it is talking to a server rather than a proxy. This can cause problems where an intercepting proxy requires authentication. Then, the user connects to a site which also requires authentication. Finally, intercepting connections can cause problems for HTTP caches, since some requests and responses become uncacheble by a shared cache.

While intercepting connections are generally discouraged, due to the simplicity of deploying such systems, they are in widespread use. It is often possible to detect the use of an intercepting proxy server by comparing the client's external IP address to the address seen by an external web server, or sometimes by examining the HTTP headers received by a server.

Some of the functions of an outbound web proxy are performed in wide area networks (WANs), where security is less of a concern. WAN acceleration is a usage-based service with some pre-population capabilities. However, it is only used in the context of a private network based on the typical traffic pattern. A pre-population feature is required to manually setup a replication between the WAN accelerators and the server with the data. Thus, data is only accelerated to a limited number of modified servers.

It would be advantageous if data could be more quickly and securely uploaded from a client to a service provider server, without having to use specially modified servers.

SUMMARY OF THE INVENTION

Disclosed herein are a system and method to accelerate the upload of data (files) from a network client to a server. Advantageously, a high speed upload of a large amount of data is enabled. For example, an individual, from home, may use this method to upload a large amount of pictures to a web site. The method disclosed herein originates an upload request from a client for the transfer data to a server, from a third party application hosted on a network having a wider bandwidth than is available to the originator client.

Accordingly, a method is provided for accelerated data uploading to a remote service device destination. In this method an on-line (third party) storage device receives an upload request message from a network-connected client device. A unique first descriptor in a descriptor field of the upload request message is accessed and compared to a list of descriptors maintained by the on-line storage device. If the accessed first descriptor is on the list, a first file is read that is stored in the on-line storage device and associated with the accessed first descriptor. The first file is then sent to a network-connected remote service device.

Prior to receiving the upload request message, the on-line storage device receives the first file from the client device at a first, relatively slow data rate, and establishes the first descriptor for the first file. For example, the first file may be sent to the on-line storage device in between the client performing higher priority tasks. In this manner, the client is not aware of long file transfer periods. Advantageously though, when the user makes a decision to send the first file to the service provider, the first file can be sent from the on-line storage device at a second data rate, greater than the first data rate.

Additional details of the above-described method, acceleration methods from the perspectives of the client and service provider, and an on-line storage device data uploading acceleration system are provided below.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component, may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
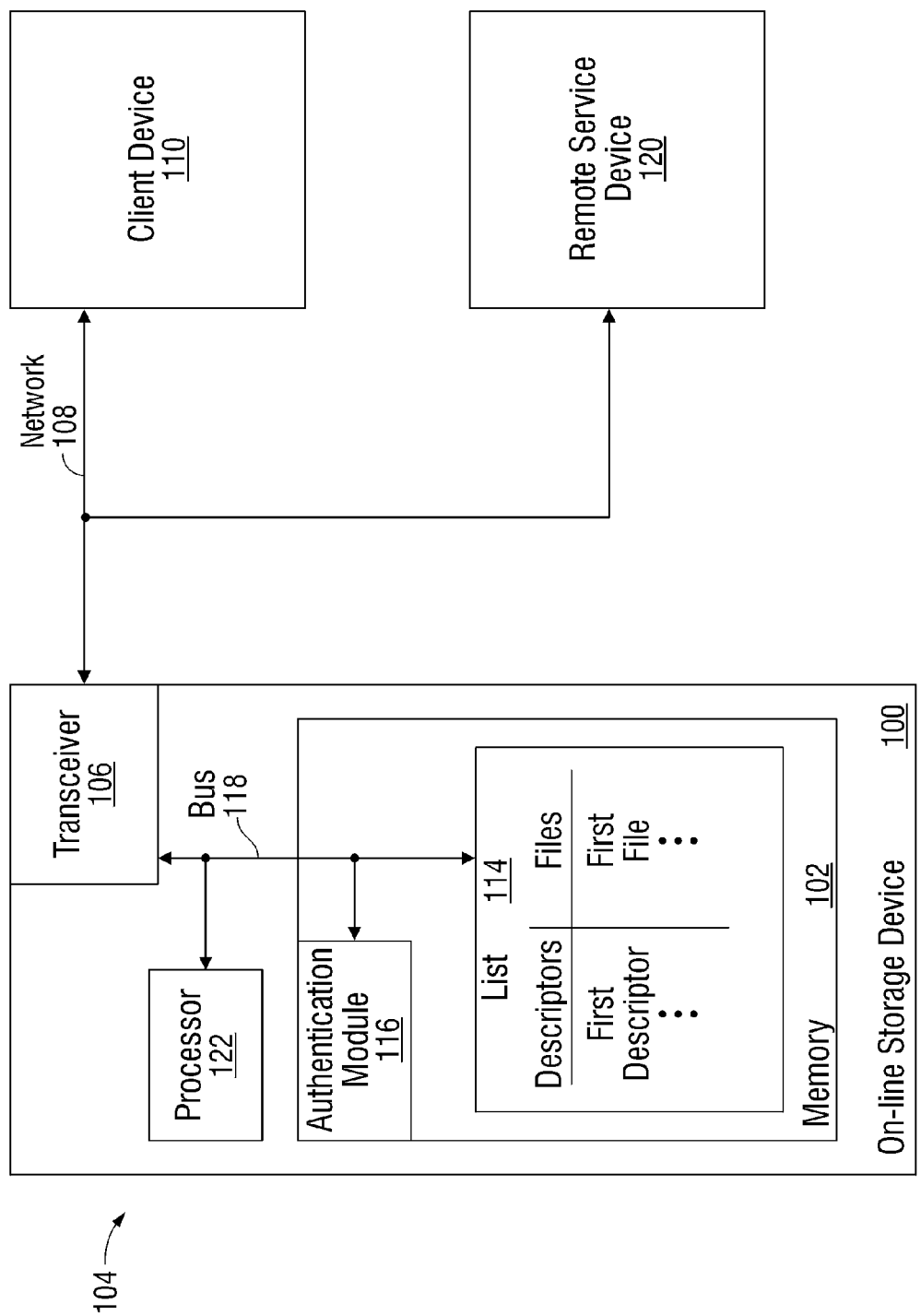
FIG. 1 is a schematic block diagram of an on-line storage device system for accelerated data uploading to a remote service device destination.

FIG. 1 is a schematic block diagram of an on-line storage device 100 system for accelerated data uploading to a remote service device destination. In a simple form, an on-line storage device may comprise a passive memory device 102, or a plurality of memory devices connected together through a network switch (not shown). The system 104 comprises a transceiver 106 having a network interface on line 108 for receiving an upload request message from a network-connected remote client device 110. Although only a single client device is shown, it should be understood that the on-line storage device may interact with a plurality of client devices. The upload request message, and other messages disclosed herein are understood to including a series of handshaking signals, or a succession of signal prompts and signal responses. The memory 102 includes a list 114 of descriptors cross-referenced to files stored in the memory.

An authentication module 116 has an interface on line 118 for accessing a unique first descriptor in a descriptor field of the upload request message. The authentication module 116 compares the accessed first descriptor to the list 114 of descriptors, and if the accessed first descriptor is on the list, reads a first file stored in the memory 102 that is associated with the accessed first descriptor. The transceiver 106 sends the first file to a network-connected remote service device 120. Note: although only a single service device is shown, the on-line storage device may be capable of sending files to a plurality of remote service devices.

The system 104 may employ a computer system with a bus or other communication mechanism for communicating information, and a processor 122 coupled to the bus 118 for processing information. The computer system may also includes a main memory, such as a random access memory (RAM) or other dynamic storage device, coupled to the bus for storing information and instructions to be executed by processor. These memories may also be referred to as a computer-readable medium. For simplicity, all the memories associated with the on-line storage device are shown as one element, identified by reference designator 102. The execution of the sequences of instructions contained in a computer-readable medium may cause a processor to perform some of the steps associated with authentication module functions. Alternately, these functions, or some of these functions may be performed in hardware. The practical implementation of components of the system 102 as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

As used herein, the term "remote" is not defined by geographical location of network protocol. In one aspect, the network can be a local network or intranet connecting devices that are proximity located. In another aspect, the client device may initially communicate with a modem (not shown) using an Ethernet protocol. Ultimately, the on-line storage device transceiver 106 may be a physical layer (PHY) device separated from the client and service device (service provider) by thousands of miles apart and communicate via the Internet, in which case the upload request message, and other messages mentioned herein may be digitally enveloped in successive protocol layers and carried via a synchronous optical network (SONET) network. Communicating devices are not to be considered as remote or local based upon the protocol being used to support communications.

Rather, the term "remote" defines entities that have separate identities, names, or legal standing. Thus, different memory modules and servers, distributed over several states, may be local components of the on-line storage device or service provider. On the other hand, a component of the on-line storage device physically co-located with the service provider is considered to be remote from the service provider, if the on-line storage device is operated by a different legal entity.

Although it would be possible to build the authentication module exclusively from hardware, more typically the module is a software application stored in memory 102, as shown, connected to microprocessor 122 via a data/address bus 118. In that case, the authentication module is enabled as software instructions that are executed by the microprocessor. Alternately (not shown), an operating system (OS) is used to manage the authentication module, as well as other applications (not shown), such as might be embedded in a personal computer. Likewise, client and service provider functions may be enabled by a computer system executing software instructions stored in memory.

Prior to sending any files to the service provider 120, the files must initially be sent from the client device 110. Thus, prior to receiving the upload request message, the transceiver 106 receives the first file from the client device 110 at a first data rate. The authentication module 116 establishes the first descriptor for the first file, adds the first file to memory 102, and adds the first descriptor to the list 114 in memory. In one aspect, the authentication module derives the first descriptor from the content of the first file.

The transceiver 106 is able to send the first file to the service device 120 at a second data rate, greater than the first data rate. In one aspect, the on-line storage device is equipped with "fat pipes" (e.g., a T1 connection) to maximize its bandwidth. It should also be noted that the rate at which some client devices can send information, i.e. the first rate, is limited. Thus, once files have been stored with the on-line storage device, they can be transferred much more quickly that if they were sent (directly) from the client.

In one aspect, the authentication module 116 creates a token ID prior to sending the first file, which is sent to the client device 110 for delivery to the service device 120. A token ID is a password or means of identity enacted as a security measure, to ensure that the on-line storage device only sends files to entitled parties. The assumption being that the service device 120 can only obtain the token ID from a legitimate source, i.e. the client device 110. Then, the authentication module 116 receives a send-file request message with the token ID and first descriptor from the remote service device 120, and sends the first file to the remote service device in response to the send-file request message.

Functional Description

The token ID is created by the on-line storage device upon reception of an upload request from the client. Here is an algorithm the on-line storage device could follow:
 a. Receive File ID (descriptor), on-line backup credentials, remote service. ID from the client device;
 b. Generate a unique identifier (token ID) by merging the account ID with an incremental session number;
 c. Create a record in an associative table with the [Token ID, File ID, service ID];
 d. Send the token ID back to the client.
At the client:
 a. Receive the token ID from the on-line service device;
 b. Send the token ID and file ID (descriptor) to service device.

At the service device:
 a. Receive File ID, Token ID, and on-line backup service ID;
 b. Lookup the on-line storage device ID in a table to extract the protocol, port and IP address for the on-line storage device;
 c. Connect to the on-line storage device;
 d. Send token ID and File ID to on-line storage device;
 e. Receive connection from on-line storage device;
 f. Send the transfer complete message back to the client—this might require the token ID as well, depending on what technology is used.

Example

A home Internet customer is uploading pictures on a website. Their house Internet access is provided through a DSL line (or Cable modem) and, therefore, has a limited upload bandwidth of 512 kilobits per second (Kb/s). Each picture is between 8 and 12 megabytes (MB) large. If 100 pictures are sent, the upload time is a minimum 6 hours.

With the development of cloud services, the efficient distribution of personal data will become a key factor in the success of this technology. Digital media will particularly benefit from the system described above: with the adoption of high definition technologies both for pictures and movies the size of files are likely to increase exponentially in the next few years. It will be impossible for the Internet service providers to scale their access network at the same rate of growth.

Conventional technologies do not offer any content aware upload acceleration capabilities. WAN acceleration does offer (providing you have an active system on both end of the connection) some minor acceleration by using compression and dedup. However, the system of FIG. 1 offers the ability to upload files by using virtually no bandwidth on the client's network side. Dedup is a form of compression limiting the storage of redundant data in a file system. Blocks containing the same data are instead replaced with a pointer to an existing block containing the same information.

The customer client must have previously subscribed to an on-line backup of their personal data. The on-line storage device and client are aware of the required protocols, and the on-line storage device and the client local file system are synchronized transparently.

Typically, the remote service is an on-line service (Internet or private) providing a service pertaining to the data being uploaded (such as picture printing). The customer or user is a system attempting to upload content from a residence of home, for example. The software used to access to the remote service is called a "client". The on-line storage device is a network-connected entity storing a copy of the user's files.

Figure 2:
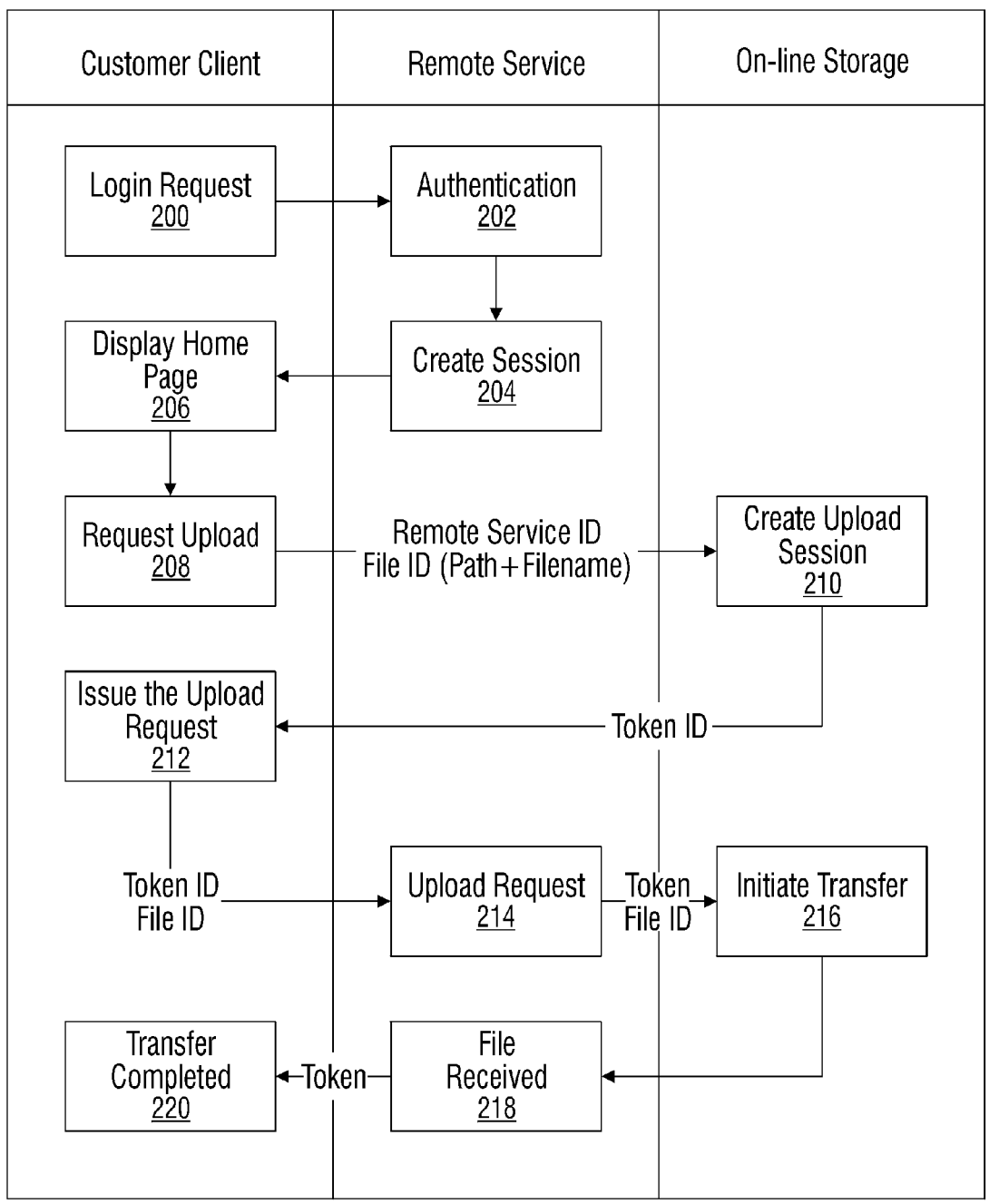
FIG. 2 is a flowchart illustrating the accelerated data uploading process associated with the system of FIG. 1.

FIG. 2 is a flowchart illustrating the accelerated data uploading process associated with the system of FIG. 1. In Step 200 the customer logs-in to the remote service. In Step 202 the customer sends an upload request with the remote service identifier to the remote service host. In Steps 204 and 206 a session is created and an accelerated loading home page is display is on the client device. In Step 208 the client request a token key (ID) from the on-line storage device, with the full path and filename of the file it is trying to upload. In Step 210 the on-line storage device sends the token ID and a hash value (e.g., descriptor) of the file to be uploaded to the remote service device, which is passed to the remote service device by the client in Step 212. In Step 214, the remote service device contacts the on-line storage device with token ID and hash value. The on-line storage service device initiates the transfer of the file in Step 216. After receiving the file in Step 218, a transfer complete message is sent to the client in Step 220. As an alternative to the remote service notifying the client, the on-line storage device can send the notification.

Figure 3:
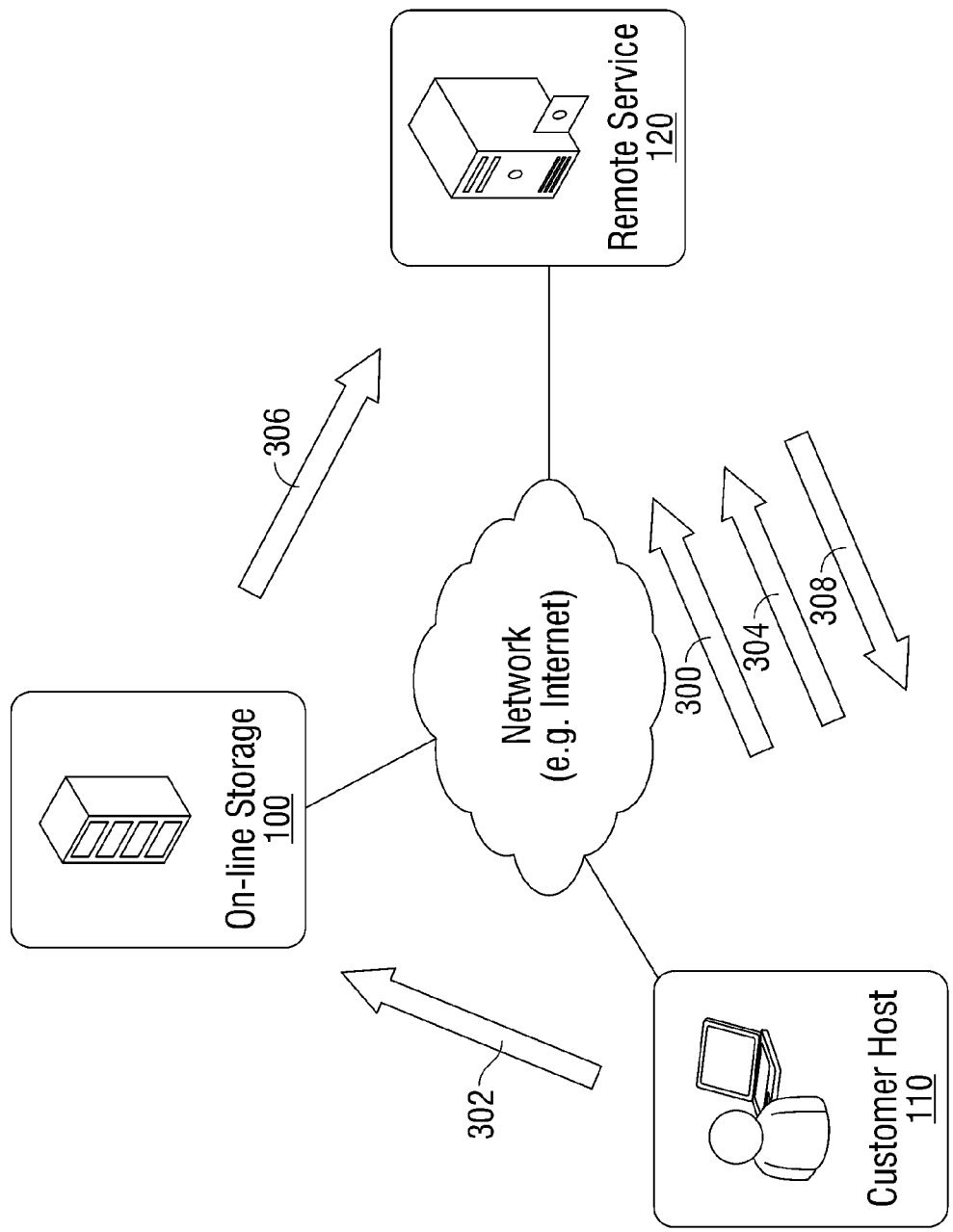
FIG. 3 is a schematic block diagram illustrating the accelerated data uploading process of FIG. 2 from an alternate perspective.

FIG. 3 is a schematic block diagram illustrating the accelerated data uploading process of FIG. 2 from an alternate perspective. Step 300 is associated with Steps 200-208 of FIG. 2—initial communications and session creation between the client and remote service device. Step 302 corresponds to Steps 208-212 of FIG. 2—request and receipt of the token ID by the client. Step 304 corresponds to Step 214 of FIG. 2—sending the token ID from the client to the remote service device. Step 306 corresponds to Steps 216-218 of FIG. 2—sending the file from the on-line storage device to the remote service device. Step 308 corresponds to Step 220 of FIG. 2—client notification.

Figure 4:
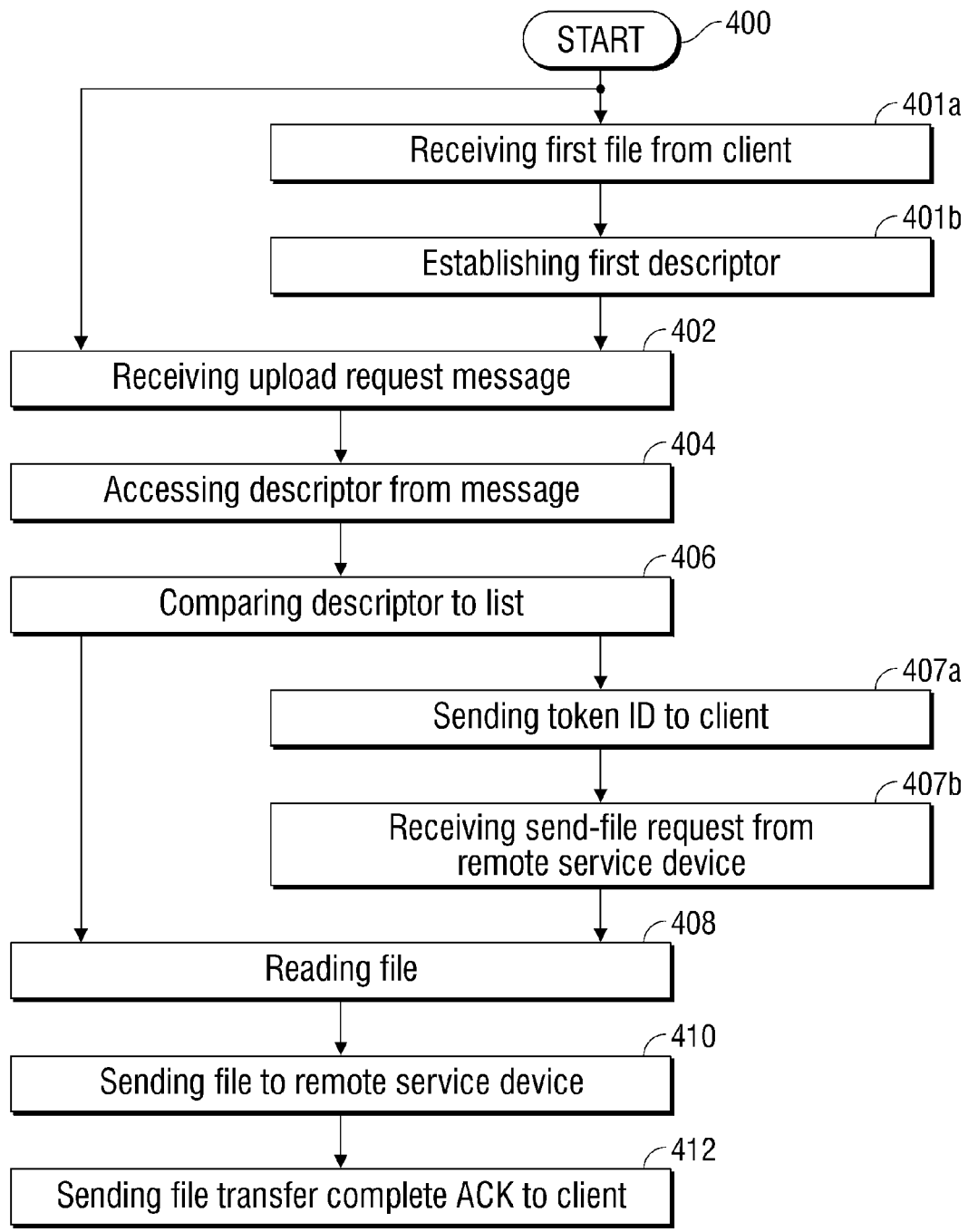
FIG. 4 is a flowchart illustrating a method for accelerated data uploading to a remote service device destination from the perspective of an on-line storage device.

FIG. 4 is a flowchart illustrating a method for accelerated data uploading to a remote service device destination from the perspective of an on-line storage device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 400.

In Step 402, the on-line storage device receives an upload request message from a network-connected remote client device. Step 404 accesses a unique first descriptor in a descriptor field of the upload request message. In one aspect, Step 404 accesses an additional attribute such as a remote service device identifier, a file name, a directory path, file extension, access key, metadata, access date, last modified date, creation date, user ownership, group ownership, size, compressed size, description, author, title, or combinations of the above-described attributes. An access key is a public or private key associated with a file providing the necessary encryption and authorization credentials required to access to the content of the file. Metadata is a data structure attached to a file data providing additional information on the nature of the file. For example, a file descriptor may contain a record specifying the name of the author and/or the name of the machine where the file was created.

Step 406 compares the accessed first descriptor to a list of descriptors maintained by the on-line storage device. If the accessed first descriptor is on the list, Step 408 reads a first file stored in the on-line storage device, associated with the accessed first descriptor. Step 410 sends the first file to a network-connected remote service device. In one variation, subsequent to sending the first file to the remote service device, Step 412 sends a file transfer complete acknowledgement to the client device.

In one aspect prior to receiving the upload request message, Step 401a receives the first file from the client device at a first data rate, and Step 401b establishes the first descriptor for the first file. Advantageously, Step 410 sends the first file at a second data rate, greater than the first data rate. The first descriptor may be derived by the client and on-line storage device using an agreed-upon algorithm. For example, the first descriptor may be derived from content of the first file (e.g., a hash). Alternately, the first descriptor may be created by either the client or on-line storage device, and sent to the other.

In another aspect prior to sending the first file to the remote service device in Step 410, the on-line storage device sends a token ID to the client device in Step 407a, for delivery to the remote service device. In Step 407b the on-line storage device receives a send-file request message, including the token ID and the first descriptor, relayed by the client device, from the remote service device. Then, sending the first file to the remote service device in Step 410 includes sending the first file in response to the send-file request message.

In one aspect, receiving the send-file request message in Step 407a includes the on-line storage device receiving an additional attribute such as a remote service device identifier, a file name, a directory path, or combinations of the above-described attributes.

Figure 5:
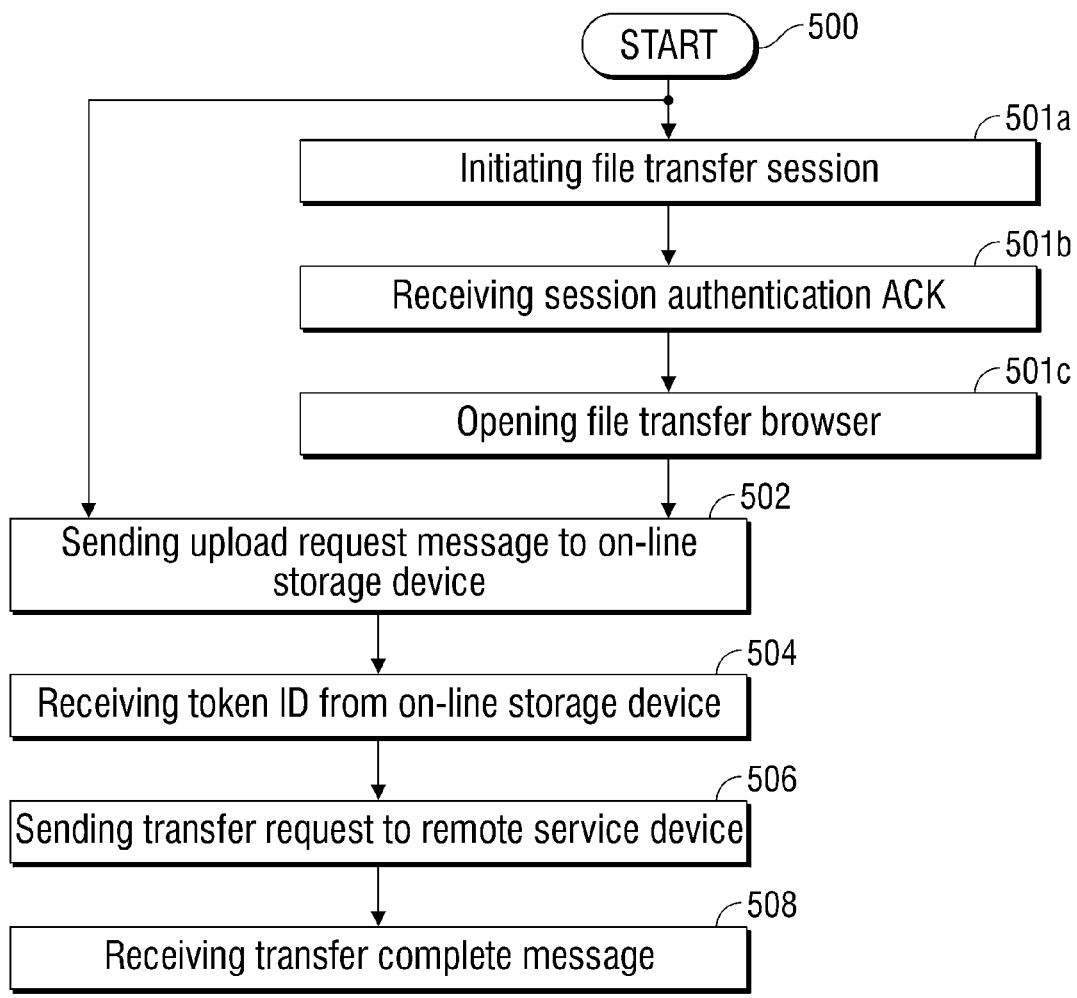
FIG. 5 is a flowchart illustrating a method for accelerated data uploading to a remote service device destination from the perspective of a client device.

FIG. 5 is a flowchart illustrating a method for accelerated data uploading to a remote service device destination from the perspective of a client device. The method starts at Step 500. Step 502 sends an upload request message including a unique first descriptor to a network-connected remote on-line storage device. Step 504 receives a token ID from the on-line storage device. Step 506 sends a transfer request message, including the token ID and the first descriptor, to a network-connected remote service device. Step 508 receives a transfer complete message from either the on-line storage device or the remote service device, indicating that the first file has been sent to the remote service device from the on-line storage device.

In one aspect prior to sending the upload request message to the on-line storage device (Step 502), the client device sending a login request to the remote service device in Step 501a initiating a file transfer session. In Step 501b the client device receives an acknowledgement from the remote service device authenticating the session. Step 501c opens an accelerated file transfer web browser residing on the client device. Then, sending the upload request message in Step 502 includes sending the upload request message in response to user commands prompted by the web browser.

In another aspect, sending the upload request message to the on-line storage device in Step 502 includes sending an upload request message with additional attribute such as a remote service device identifier, a file name, a directory path, or combinations of the above-described attributes. Likewise, sending the transfer request message to the remote service device in Step 506 may include sending an attribute such as a remote service device identifier, a file name, a directory path, file extension, access key, metadata, access date, last modified date, creation date, user ownership, group ownership, size, compressed size, description, author, title, or combinations of the above-described attributes.

Figure 6:
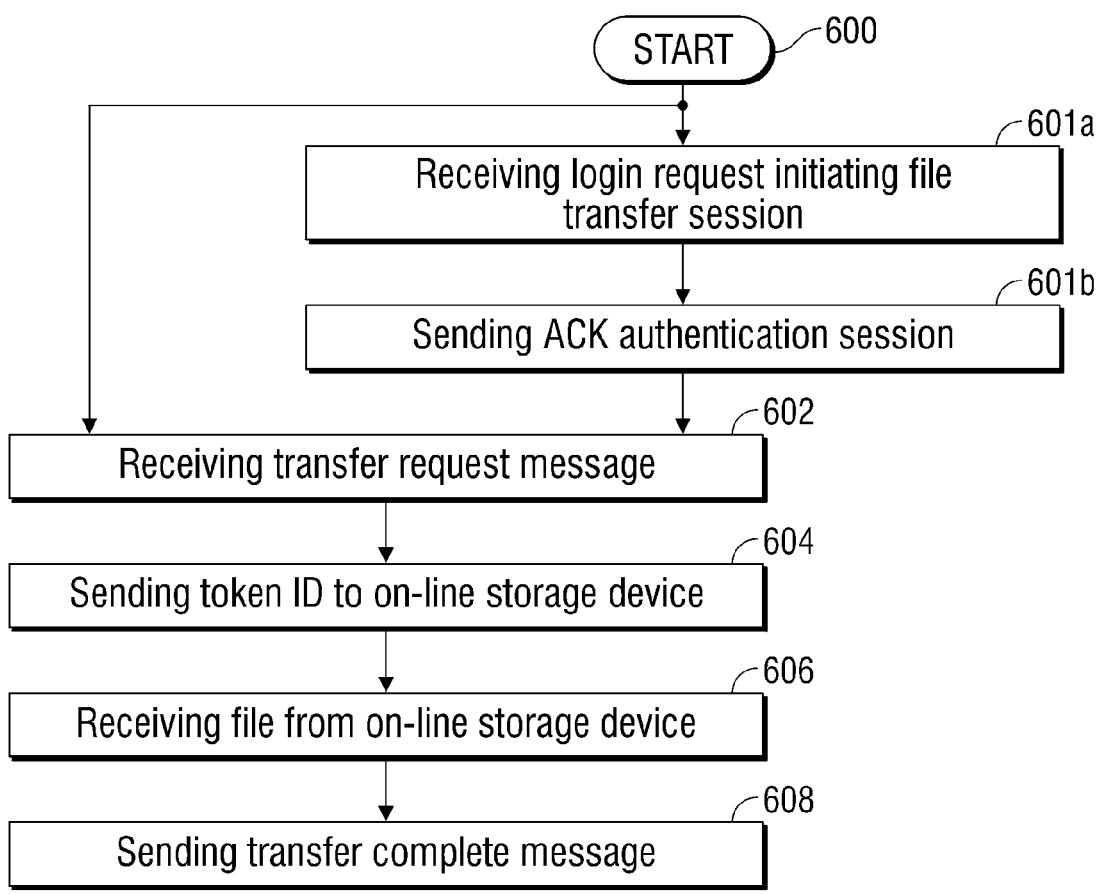
FIG. 6 is a flowchart illustrating a method for accelerated data uploading to a remote service device destination from the perspective of the remote service device.

FIG. 6 is a flowchart illustrating a method for accelerated data uploading to a remote service device destination from the perspective of the remote service device. The method starts at Step 600. Step 602 receives a transfer request message, including a token ID, first descriptor, and an on-line storage device ID, from a network-connected remote client device. Step 604 sends the token ID and first descriptor to a network-connected remote on-line storage device associated with the on-line storage device ID. Step 606 receives a first file associated with the client device, from the on-line storage device. In one aspect, subsequent to receiving the first file, Step 608 sends a transfer complete message to the client device.

In another aspect, prior to receiving the transfer request message in Step 602, the remote service device receives a login request and session ID key from the client device in Step 601, initiating a file transfer session. In Step 601b the remote service device sends an acknowledgement to the client device authenticating the session. Then, sending the token ID and first descriptor to the on-line storage device in Step 604 includes additionally sending the session ID key.

A system and method have been provided for accelerated upload to a remote service device. Some examples of specific communication algorithms have been given to illustrate the invention. However, the invention is not limited to merely these examples. Other variations and embodiments of the invention will occur to those skilled in the art.

I claim:

1. A method for accelerated data uploading to a remote service device destination from an on-line storage device, the method comprising
   prior to receiving an upload request message, an on-line storage device receiving and storing a first file from a network-connected remote client device at a first data rate;
   establishing a unique first descriptor associated with the first file;
   receiving an upload request message from the client device;
   accessing the first descriptor in a descriptor field of the upload request message;
   comparing the accessed first descriptor to a list of descriptors maintained by the on-line storage device;
   if the accessed first descriptor is on the list, the on-line storage device reading the stored first file; and,
   the on-line storage device sending the first file to a network-connected remote service device at a second data rate greater than the first data rate.

2. The method of claim 1 wherein establishing the first descriptor for the first file includes establishing a first descriptor derived from content of the first file.

3. The method of claim 1 further comprising:
   prior to sending the first file to the remote service device, the on-line storage device sending a token ID to the client device, for delivery to the remote service device;
   the on-line storage device receiving a send-file request message, including the token ID and the first descriptor, relayed by the client device, from the remote service device; and,
   wherein sending the first file to the remote service device includes sending the first file to the remote service device in response to the send-file request message.

4. The method of claim 3 wherein receiving the send-file request message includes the on-line storage device receiving an attribute selected from a group consisting of a remote service device identifier, a file name, a directory path, and combinations of the above-described attributes.

5. The method of claim 1 further comprising:
   subsequent to sending the first file to the remote service device, sending a file transfer complete acknowledgement to the client device.

6. The method of claim 1 wherein accessing the first descriptor from the upload request message includes accessing an additional attribute selected from a group consisting of a remote service device identifier, a file name, a directory path, file extension, access key, metadata, access date, last modified date, creation date, user ownership, group ownership, size, compressed size, description, author, title, and combinations of the above-described attributes.

7. In an on-line storage device, a system for accelerated data uploading to a remote service device destination, the system comprising:
   a transceiver having a network interface for receiving an upload request message from a network-connected remote client device;
   a memory including a list of descriptors cross-referenced to files stored in the memory;
   an authentication module having an interface for accessing a unique first descriptor in a descriptor field of the upload request message, comparing the accessed first descriptor to the list of descriptors, and if the accessed first descriptor is on the list, reading a first file stored in the memory that is associated with the accessed first descriptor;
   wherein the transceiver sends the first file to a network-connected remote service device;
   wherein the transceiver, prior to receiving the upload request message, receives the first file from the client device at a first data rate;
   wherein the authentication module establishes the first descriptor for the first file, adds the first file to memory, and adds the first descriptor to the list in memory; and,
   wherein the transceiver sends the first file to the remote service device at a second data rate greater than the first data rate.

8. The system of claim 7 wherein the authentication module derives the first descriptor from the content of the first file.

9. The system of claim 7 wherein the authentication module creates a token ID prior to sending the first file, which is sent to the client device for delivery to the remote service device; and,
   wherein the authentication module receives a send-file request message including the token ID and first descriptor, from the remote service device, and sends the first file to the remote service device in response to the send-file request message.

* * * * *